(12) United States Patent
Bauchot et al.

(10) Patent No.: US 7,743,105 B2
(45) Date of Patent: *Jun. 22, 2010

(54) SYSTEM, METHOD AND PROGRAM FOR SELECTING RECIPIENTS OF AN E-MAIL

(75) Inventors: Frederic Bauchot, Saint-Jeannet (FR); Gerard Marmigere, Drap (FR); Francois-Xavier Drouet, La Gaude (FR)

(73) Assignee: International Business Machines Corporation, Armonk, NY (US)

(*) Notice: Subject to any disclaimer, the term of this patent is extended or adjusted under 35 U.S.C. 154(b) by 1232 days.

This patent is subject to a terminal disclaimer.

(21) Appl. No.: 11/157,396

(22) Filed: Jun. 21, 2005

(65) Prior Publication Data
US 2006/0036699 A1 Feb. 16, 2006

(30) Foreign Application Priority Data
Jul. 30, 2004 (EP) .................................. 04291950

(51) Int. Cl.
G06F 15/16 (2006.01)
(52) U.S. Cl. .................................................... 709/206
(58) Field of Classification Search ................. 709/206, 709/207
See application file for complete search history.

(56) References Cited

U.S. PATENT DOCUMENTS

| 6,247,045 B1* | 6/2001 | Shaw et al. .................. 709/207 |
| 7,155,484 B2* | 12/2006 | Malik .......................... 709/206 |
| 2003/0061289 A1* | 3/2003 | Clissold et al. ............. 709/206 |

OTHER PUBLICATIONS

Klensin, J., "Simple Mail Transfer Protocol", AT&T Laboratories, Apr. 2001, RFC 2821 (57 pages).
Resnick, P., "Internet Message Format", QUALCOMM Incorporated, Apr. 2001, RFC 2822 (51 pages).

* cited by examiner

*Primary Examiner*—Vivek Srivastava
*Assistant Examiner*—Xiang Yu
(74) *Attorney, Agent, or Firm*—Yee & Associates, P.C.; Arthur J. Samodovitz

(57) ABSTRACT

System, method and program product executed at a workstation for selecting recipients of an e-mail. The workstation displays an initial list of potential recipients of said e-mail. A user identifies to the workstation a first type of recipient to receive the e-mail. The initial list including at least one recipient of the first type. A user identifies to the workstation a second type of recipient not to receive the e-mail. The initial list including at least one recipient of the second type. The workstation automatically determining a final list of recipients to receive the e-mail. The final list is the recipients of the initial list which are the first type but not the second type.

20 Claims, 6 Drawing Sheets

Mail Adresss Manager Table ( MAMT)

| List ID | List Color | List Filters | | | | | Expand | List Exceptions |
|---------|------------|----|----|-----|-----------|------------|--------|-----------------|
|         |            | To | Cc | Bcc | Filter IN | Filter OUT |        |                 |
|         |            |    |    |     |           |            |        |                 |
|         |            |    |    |     |           |            |        |                 |
|         |            |    |    |     |           |            |        |                 |
|         |            |    |    |     |           |            |        |                 |

SYSTEM, METHOD AND PROGRAM FOR SELECTING RECIPIENTS OF AN E-MAIL

BACKGROUND

The present invention relates generally to e-mail, and more particularly to selection of recipients of an e-mail.

In an early e-mail system the first line of a message contained the recipient's address. Subsequent e-mail systems and protocols have been defined by RFC (Request For Comments) documents These standards include Simple Mail Transfer Protocol (SMTP), RFC 2821 and Internet Message Format (RFC 822 and RFC 2822). On the basis of the SMTP model, a user preparing a simple e-mail composes the text of the message and provides additional information which will be sent in a header of the message. The e-mail author indicates the sender name ('From' field in the e-mail header), and the recipients. The recipient(s) can be the name(s) of the final recipient ('To' field), and optionally, the names of the people that are copied ('.Cc' field) and the names of people that are 'Blind Carbon Copied' ('.Bcc' field). The recipient names correspond to network or "IP" addresses.

The e-mail author can type recipient names into the e-mail address fields or the e-mail author can select a preexisting distribution list. In some business areas such as marketing, the number of recipients ('To', '.Cc', '.Bcc') is very important and the management of the addresses can become very complex, time consuming and error prone.

European patent application entitled, "A SYSTEM AND METHOD FOR PREPARING ELECTRONIC MAILS" serial number 04291949.8 filed Jul. 29, 2004 by F. Bauchot, F-X Drouet and G. Marmigere allows an e-mail author to select different recipients for different sections of the e-mail text. The European patent application uses tags in the message text to identify different sections and their corresponding recipient lists. A Selective Mail Parser in a client side e-mail management application identifies the e-mail coded with the tags and prepares the e-mail to be sent to the server side of the e-mail management application. The European patent application also discloses that if the recipient requests to Reply to the e-mail, the system will automatically identify a list of recipients to include all the recipients having a super set of the e-mail.

Other known tools to control a recipient list are based on Directories. Such Directories can either be a general shared Directory or a local address book. The Directories could contain distribution lists which facilitate sending of the e-mail to multi-recipients. For example, a Directory of a sales organization of a company may include a distribution list containing the e-mail addresses of all sales representatives.

According to SMTP, a mailbox is a virtual entity which corresponds to file storage and receives e-mail for a recipient. When it is desirable to treat several mailboxes as a single group (i.e. in a distribution list), a group construct can be used. The group construct allows the sender to indicate a named group of recipients without actually providing the individual mailbox address for each of the members of the group. When the sender creates the message, he/she can identify the name of the group or distribution list as the recipient. In response, the e-mail application operating on its workstation automatically creates a message for each member found in the group or distribution list at the envelope level. The Header of the message contains the name of the group or distribution list.

Another known e-mailing system allows the user to compose e-mail messages and specify lists of recipients with a text editor. The user can use a copy/paste function to select and move e-mail addresses of the e-mail and/or distribution lists to prepare a desired list of recipients in the 'To', '.Cc' and '.Bcc' fields.

An object of the present invention is to facilitate identification of recipients of an e-mail.

SUMMARY OF THE INVENTION

The present invention resides in a system, method and program product executed at a workstation for selecting recipients of an e-mail. The workstation displays an initial list of potential recipients of said e-mail. A user identifies to the workstation a first type of recipient to receive the e-mail. The initial list including at least one recipient of the first type. A user identifies to the workstation a second type of recipient not to receive the e-mail. The initial list including at least one recipient of the second type. The workstation automatically determining a final list of recipients to receive the e-mail. The final list is the recipients of the initial list which are the first type but not the second type.

In accordance with a feature of the present invention, the foregoing process for selecting the final list of recipients can be applied either to the complete text of an e-mail or a portion of the text of the e-mail.

As examples, the first type of recipient can be recipients with an e-mail address at a specified company or recipients with an e-mail address in a specified country. Likewise, the second type of recipients can be recipients with an e-mail address in a specified country.

BRIEF DESCRIPTION OF THE DRAWINGS

FIG. 4 illustrates a Mail Address Management Table according to the present invention to generate a final set of stacked SMTP messages.

DETAILED DESCRIPTION OF THE PREFERRED EMBODIMENTS

Figure 1:
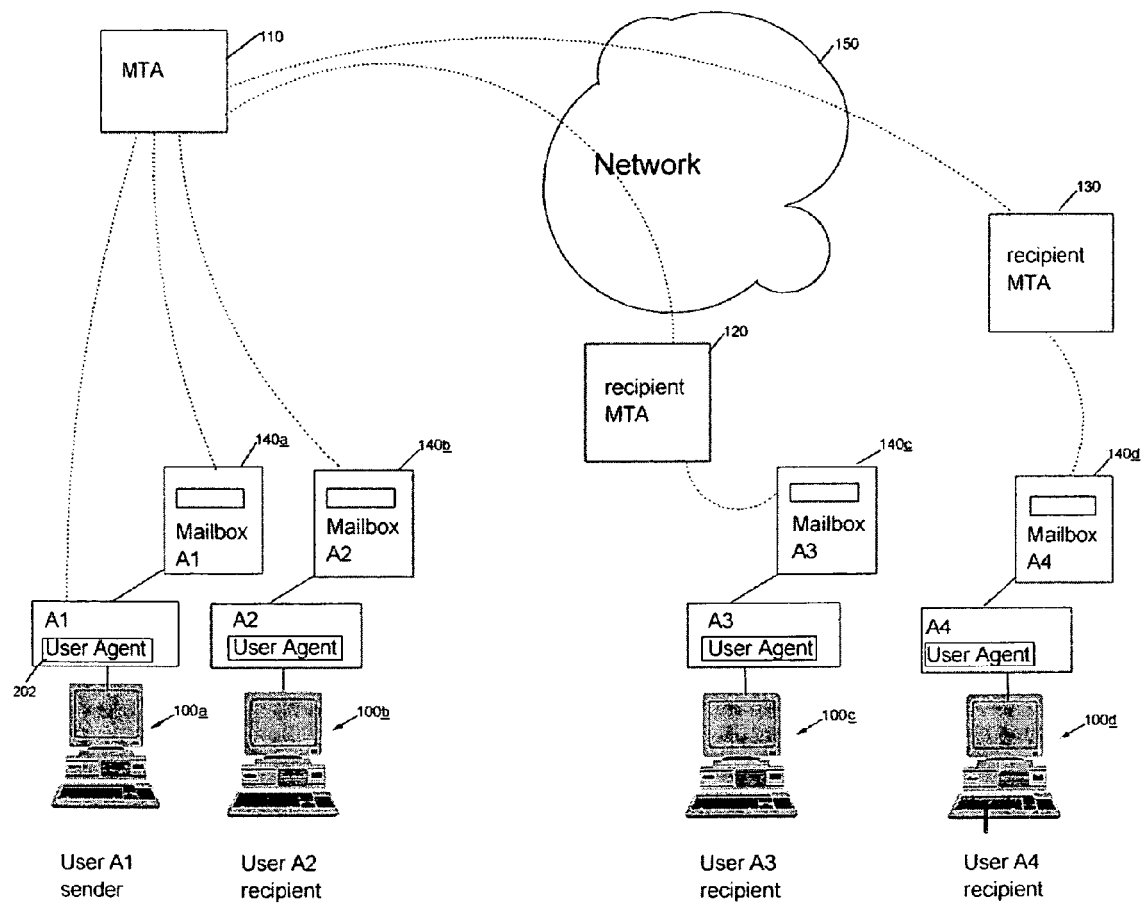
FIG. 1 illustrates a distributed computing system which supports the known SMTP model and includes the present invention.

The present invention will now be described in detail with reference to the figures. FIG. 1 illustrates a distributed computer system which supports known SMTP for distributing e-mails according to RFC 2822. Users A1 and A2 at workstations 100a and 100b, respectively, have mailboxes 140a and 140b, respectively and are clients for mail server or Mail Transfer Agent ("MTA") 110. The term "workstation" as used herein comprises desk top computers, laptop computers, PDAs, computerized cell phones, and any other type of computing device or user interface therefor. Users A3 and A4 at workstations 100c and 100d, respectively, have mailboxes 140c and 140d, respectively and are clients for mail servers or Mail Transfer Agents ("MTAs") 120 and 130, respectively. The MTAs manage e-mail addressed to and from their local users A1 and A2 and remote MTAs 120 and 130 via Internet 150. The remote MTAs themselves transfer and receive e-mail to and from their local users A3 and A4 and remote MTA 110 via the Internet 50. Each user sends an e-mail to its local MTA. The e-mail comprises the message or data of the e-mail and the name(s) of recipient(s) of the e-mail. To deliver an e-mail to a local user, the MTA identifies the corresponding network address of the recipient and forwards the e-mail to the recipient's mailbox/repository 140. The sender and recipient names correspond to their respective mailbox identifiers.

According to the present invention, workstation 100a includes a Client Mail Application program 200 (shown in FIGS. 1 and 2) which includes a user agent 202 and other programming, supports the SMTP protocol and allows the User A1 to create custom distribution lists (such as to Users A2, A3 and A4) based on existing distribution lists.

Figure 2:
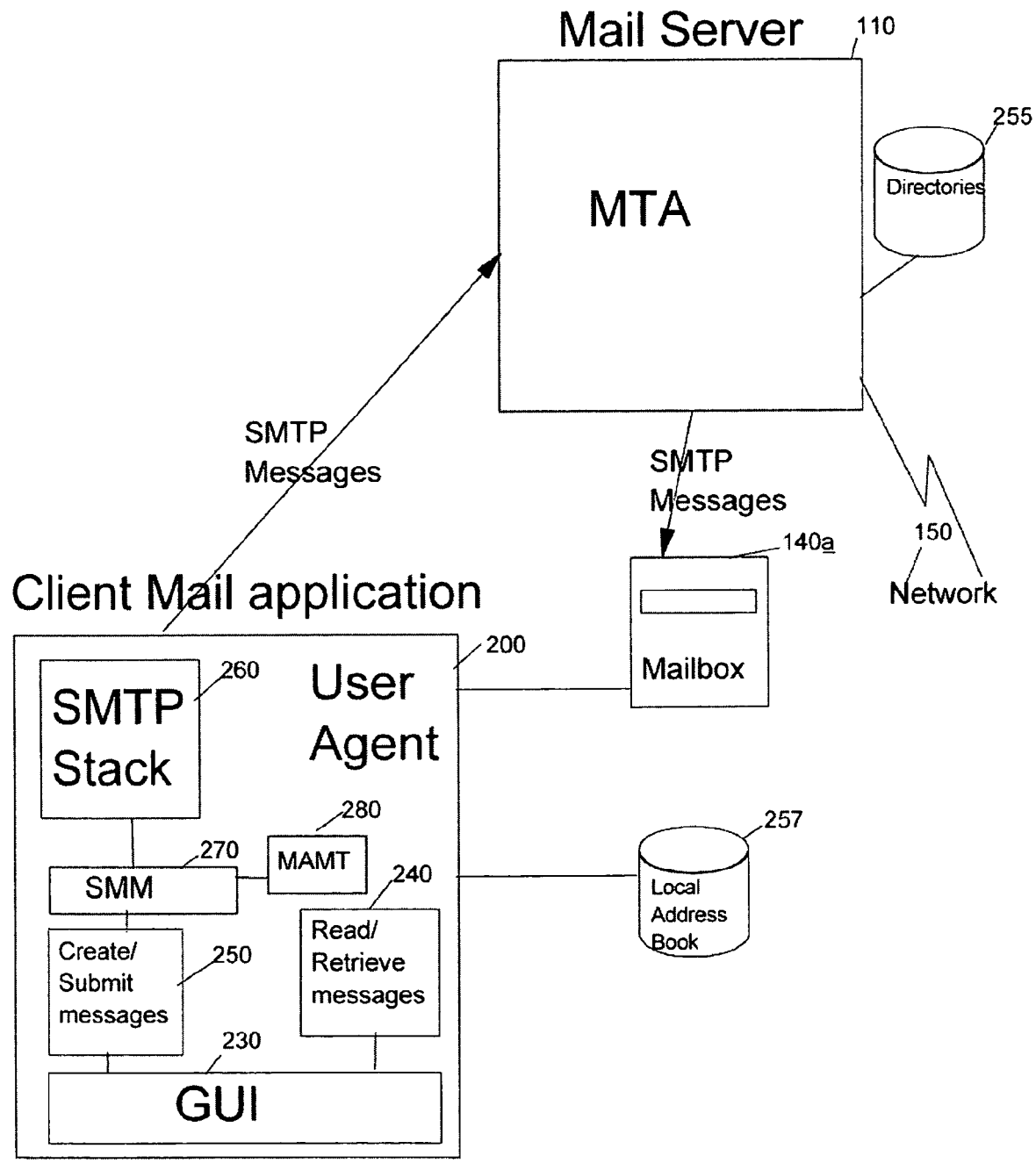
FIG. 2 is a block diagram of a client workstation and mail server of FIG. 1 wherein the client workstation includes a client e-mail application according to the present invention.

FIG. 2 illustrates in more detail the Client Mail Application 200 within the user workstation 100a. To send and receive e-mails, the Client Mail application 200 includes a Graphical User Interface (GUI) 230 and the following functions:

Create message function (i.e. an E-Mail composer) 250 allows access to Directories stored by the local MTA 110 or remote MTAs 120 and 130 or Directories from the local address book 257 which is the local space of the User A.

Submit message function 250 translates the message in accordance with "Internet Message Format" of RFC2822, with the coding of the body part in known MIME format. Document series RFC2045, RFC2046 and RFC2049 are relevant for this function.

SMTP Stack 260 receives the message in the right format to be submitted to the MTA using SMTP.

Read/Retrieve Message function 240 accesses the storage of the messages in Mailbox 140a. The messages are stored in accordance with RFC2822, so GUI has to parse the message to display the message to the user.

In accordance with the present invention, a Selective Message Manager ("SMM") 270 is associated with the Create message function 250. The SMM allows the e-mail author through the GUI to manage recipient address lists and introduce in the text of the message, tags identifying a subset of an e-mail message with associated recipient address list information. The user defines with a GUI 230, information on the text of the e-mail to be prepared and the information to build the recipient list. The SMM stores in a Mail Address Management Table ("MAMT") 280 the information of each e-mail to be sent to a list of recipients. The recipient list and message text are then passed, in a known manner, to SMTP stack 260 for sending to the local MTA.

The SMM comprises a filter to either include or exclude a generic or specific set of recipient addresses. For example the sender could start from a preexisting distribution list (such as a distribution list of Sales people of a COMPANY) and exclude members belonging to a given country (*@fr.company.com).

A first opening tag can take the following format:

<SelSec [attributes]>, where [attributes] represents a list of either mandatory or optional attributes specified with this tag. Such attributes can be for example:

"Id=xxx" for specifying an identifier
"Color=xxx" for specifying an associated color
"To=xxx" for specifying a filter on the "To" distribution list
"Cc=xxx" for specifying a filter on the "Cc" distribution list
"Bcc=xxx" for specifying a filter on the "Bcc" distribution list
"FilterIN=xxx" for specifying an including filter.
"FilterOUT=xxx" for specifying an excluding filter.
"Expand=xxx" for specifying if distribution lists must be expanded or not.
"Exception=xxx" for specifying exceptions
"List=xxx" for specifying the resulting recipient address list A second closing flag can take the following format:

</SelSec>

Figure 3A:
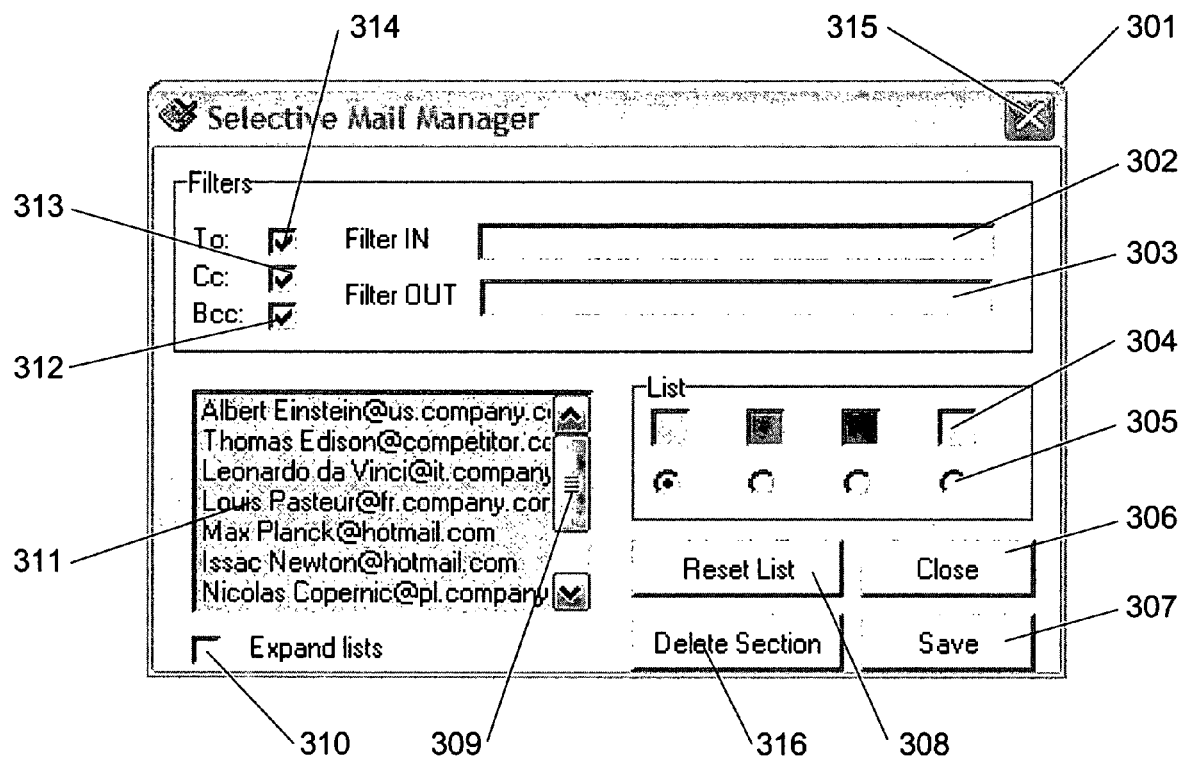
FIGS. 3A and 3B illustrates two instances of a graphical user interface according to the present invention to identify recipients of an e-mail.
Figure 3B:
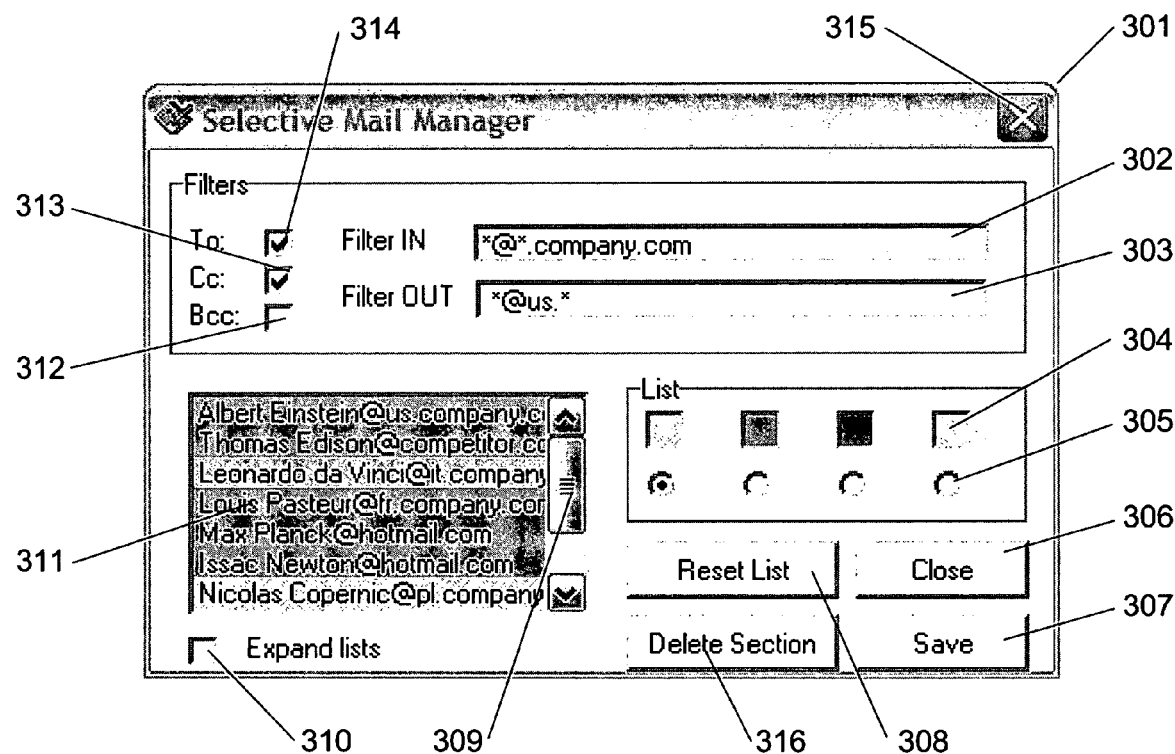

FIGS. 3A and 3B are two instances of the graphical user interface when a user/author composes the text of a message and then operates the 'selective menu' according to the preferred embodiment to select the recipients of the e-mail.

Once the author edits the text of the message using the conventional e-mail composer tools, the author identifies and characterizes the sections of the e-mail which will be selectively sent to a subset of the message recipients. For example, an e-mail has been built for delivery to the following people/recipients:

In the "To:" list: Albert_Einstein@us.company.com,
Leonardo_da_Vinci@it.company.com,
Louis_Pasteur@fr.company.com,
Nicolas_Copernic@pl.company.com
In the "Cc:" list: Thomas_Edison@competitor.com
In the "Bcc:" list: Max_planck@hotmail.com, Isaac_Newton@hotmail.com In this example, the message text is composed of a main section that should be sent to all recipients, plus three special sections that should be sent to selected recipients. These special sections will be called sections A, B and C. Assuming that sections A and B should be sent to the same set of people and the following rules apply:

Section A/B Audience:
Recipients must not be blind carbon copied,
Recipients must belong to the COMPANY,
Recipients must not be US citizens, and
Recipients must be physicians.

Assuming that section C should be sent only to Isaac Newton.

Assuming that the message author works first with section A, second with section B and third with section C, the message author will typically perform the following steps:

1. The message author selects with the pointing device the text corresponding to section A.
2. The message author clicks with the pointing device on a specific entry entitled "Selective Mail" within the "Text" drop-down menu of the message composer GUI. This action automatically opens a "Selective Mail Manager" dialog box 301, as shown on FIG. 3A. This dialog box has default settings, such as:
    The check boxes 312, 313 and 314 are all filled with a check mark.
    The entry fields 302 and 303 are empty.
    The left most radio button of the set 305 is selected.
    Accordingly, the section recipient list box 311 shows that all the members of the message are eligible for the current section (all shown with yellow background color associated with the left most radio button 305).
    At the same time that the "Selective Mail Manager" dialog box 301 is opened, the text selected by the user receives a blinking background color identical to the one associated with the selected radio button 305, yellow in the example.
3 The message author uses the pointing device and the keyboard to update the "Selective Mail Manager" dialog box

301 default settings, in order to reflect the targeted audience for the section A. This corresponds to the following actions:

Deselecting the check box 312, so that recipients present within the "Bcc:" list will not get this section A. The result is that the e-mail addresses of Max Planck and Isaac Newton are no longer with a yellow background color in the recipient list box 311.

Filling the "Filter IN" entry field 302 with the wild card *@*.company.com all the recipients belonging to the COMPANY organization. The result is that the e-mail address of Thomas Edison is no longer with a yellow background color in the recipient list box 311.

Filling the "Filter OUT" entry field 303 with the wild card *@us.* to discard all the US based recipients. The result is that the e-mail address of Albert Einstein is no longer with a yellow background color in the recipient list box 311.

Clicking with the pointing device on the e-mail address of Louis Pasteur in the recipient list box 311 to turn its background color from yellow to dark blue (meaning that it is deselected). At the end of this step, the recipient list box 311 contains only two e-mail addresses with yellow background color: Leonardo da Vinci and Nicolas Copernic, according to the rules specified above for section A recipients. This is illustrated by the FIG. 3B.

Clicking on the "Save" push-button 307 in order to memorize the different settings specified for the first list of recipients associated with the section A, and identified through the color yellow.

Clicking either on the window closing icon 315 or on the push-button "Close" 306 has the effect of closing the "Selective Mail Manager" dialog box 301. When this is done, the section A within the whole message text appears with a background color set to yellow (no longer flashing), while the corresponding recipient names appear also with yellow background color within the destination lists "To:", "Cc:" and "Bcc:".

4. The message author selects with the pointing device the text corresponding to the section B. In the following steps, the message author will take advantage of the settings for section A as both sections A and B should receive the same audience.

5. The message author clicks with the pointing device on a specific entry entitled "Selective Mail" within the Text drop-down menu of the message composer GUI. This action automatically opens a "Selective Mail Manager" dialog box 301, as shown on FIG. 3B. Here the settings already done for the yellow list are automatically recalled, so that the message author does not have to redo them. The selected text background color is turned to yellow and is flashing.

6 Clicking on the "Close" push-button 306 to close the "Selective Mail Manager" dialog box 301. When this is done, the section B within the whole message text appears with a background color set to yellow, no longer flashing, while the corresponding recipient names appear also with yellow background color within the destination lists "To:", "Cc:" and "Bcc:".

7 The message author selects with the pointing device the text corresponding to the section C.

8 The message author clicks with the pointing device on a specific entry entitled "Selective Mail" within the Text drop-down menu of the message composer GUI. This action automatically opens a "Selective Mail Manager" dialog box 301, as shown on FIG. 3B. Here the settings already done for the yellow list are automatically recalled, so that the message author does not have to redo them. The selected text background color is turned to yellow and is flashing. The next steps consist of defining a new list (associated with another color which is blue) corresponding to the audience of section C.

9 The message author clicks on the radio button 305 below the blue pad, so that the blue color is associated with the list of recipients corresponding to the section C. The result is first to reset to default values the setting of the "Selective Mail Manager" dialog box 301, and second that the section C is now flashing with blue as background color.

10. Then the message author uses the pointing device and the keyboard to update the "Selective Mail Manager" dialog box 301 current settings (which were set to default values), to reflect the targeted audience for the section C. This can be done in different ways, for example, to have all the check boxes 312, 313 and 314 filled with a check mark, to have the "Filter IN" entry field 302 filled with the address Isaac Newton@hotmail.com, or to have the "Filter OUT" entry field 303 left void.

11. Finally the message author clicks on the "Save" push-button 307 to memorize the different settings specified for the list of recipients associated to the section C. When this is done, section C within the whole message text appears with a background color set to blue (no longer flashing), while the corresponding recipient name appears also with blue background color.

12. The last step for this selective e-mail definition is for the message author to close the "Selective Mail Manager" dialog box 301 by clicking on the button 315.

When all these definitions are done, the message is filled with relevant tags (not visible to the message author) specifying for each section the associated recipient list and the associated settings entered through the "Selective Mail Manager" dialog box 301. Each of these lists is uniquely identified by an Identifier, recorded within a Mail Address Manager Table ("MAMT"), as described below with reference to FIG. 4.

Afterwards, if the message author clicks on the specific entry entitled "Selective Mail" within the "Text" drop-down menu of the message composer GUI, different cases can appear:

If the current position of the cursor is within a section already defined, then the "Selective Mail Manager" dialog box 301 is opened, and displays the settings corresponding to the list associated with the section within which the current cursor is located.

If the current position of the cursor is outside a section already defined, and if some text is currently selected, then the "Selective Mail Manager" dialog box 301 is opened, and displays the settings corresponding to the list associated with the last defined section. This allows the message author to define the current selection as a section and to associate with it either a previously defined list or a new list of recipients.

If the current position of the cursor is outside a previously defined section, and if no text is selected, then a pop-up window is displayed to warn the user that no selective e-mail section definition can be done in this case.

Regardless of the potential message, the author opens the "Selective Mail Manager" dialog box 301. Each time the current cursor position is within a previously defined section (that is displayed with a specific background color), the associated list of recipients with the lists "To:", "Cc:" and "Bcc:" are highlighted by using the same color for background.

The following is not illustrated in the foregoing example. The "Selective Mail Manager" dialog box 301 contains a check mark "Expand lists" 310 allowing the user to expand any list specified with the recipient list. By doing so, it allows the user to differentiate, if needed, between members of a given distribution list. If all the members of each specified distribution list can be handled as a single entity, then the check mark "Expand lists" 310 is un-selected so that the distribution lists are collapsed and handled as if they were a single recipient address. The "Selective Mail Manager" dialog box 301 contains a push-button "Delete Section" 316 allowing the user to turn a previously defined section as standard text which is received by all the message recipients. The "Selective Mail Manager" dialog box 301 contains a push-button "Reset List" 308 allowing the user to have the list box 311 reflecting, without exception, the filters defined by the check marks 312, 313 and 314 and the entry field 302 and 303.

Figure 5:
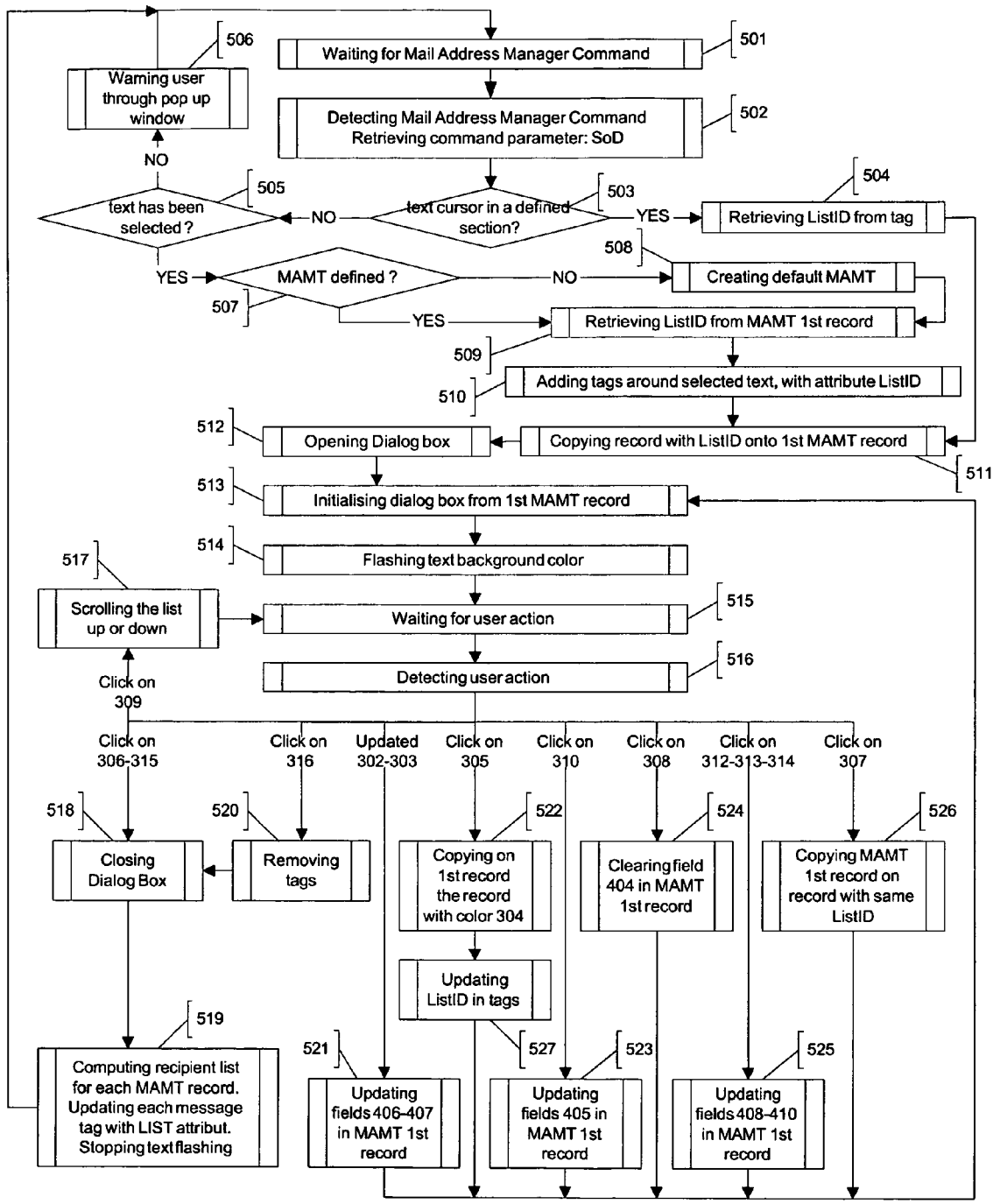
FIG. 5 is a detailed flowchart of computer programming within the workstation of FIG. 2 to select recipients of an e-mail.

FIG. 5 is a flow chart illustrating in more detail the method for selecting recipients of an e-mail according to the present invention.

At step 501, the method is waiting for an event (such as a command) to invoke the Mail Address Manager.

At step 502, a Mail Address Manager command is detected, and the parameter of the command is retrieved and written into the local variable SoD.

At step 503, a test is performed to determine if the current text cursor is positioned within an existing section:
If so, then control is given to step 504;
otherwise, control is given to step 505.

At step 504, a local variable LISTID is set equal to an Id attribute found in the tag associated with the section found at step 503. Then control is given to step 511.

At step 505, a test is performed to determine if some text has been selected:
If so, then control is given to step 507;
Otherwise, control is given to step 506.

At step 506, a pop-up window is displayed to warn the user that the Mail Address Manager cannot be invoked unless the current cursor position belongs to an existing section of text or some text is otherwise selected. Then control is given to step 501 for handling a future Mail Address Manager command.

At step 507, a test is performed to determine if a MAMT (see description of FIG. 4) table has already been initialized:
If so, then control is given to step 509;
Otherwise, control is given to step 508.

At step 508, a default MAMT table is created. As described in FIG. 4, a table is used by the SMM to store information of selective mails. The table is filled when the message is entered by the author through the graphical user interface and the mail composer as described in FIGS. 3A and 3B. As described with the following steps of the flowchart of FIG. 5, once the message is composed and the MAMT table is filled, the SMM generates the corresponding selective mails according to the message content and the list of recipients described in the MAMT table. The SMM also deletes the MAMT table rows corresponding to the generated selective mails each time it inserts them in the SMTP stock for further forwarding to the MTA according to the SMTP protocol. The MAMT table 401 comprises a top record 402 and four body records 403, each of them being associated with a specific "List ID" field 412 and a specific "List Color" field 411. The top record 402 is initialized by the fields 411 and 412 being set equal to those of the first body record 403.

At step 509, the "List ID" field 412 of the top record 402 is retrieved from the MAMT 401 table and memorized in a local variable LISTID.

At step 510, tags are introduced around the selected text, with an attribute Id set equal to the local variable LISTID.

At step 511, the body record 403 with a "List ID" field 412 equal to the local variable LISTID, is copied onto the top record 402 of the MAMT 401 table.

At step 512, the Selective Mail Manager dialog box 301 is displayed onto the display device.

At step 513, the various graphical objects presents on the Selective Mail Manager dialog box 301 are initialized according to the values of the top record 402 of the MAMT 401 table:
The "Filter IN" entry field 302 is initialized with the value of the "Filter IN" field 407 of the top record 402.
The "Filter OUT" entry field 303 is initialized with the value of the "Filter OUT" field 406 of the top record 402.
Among the four radio buttons 305, the selected one corresponds to the color pad 304 showing the color specified in the "List Color" field 411 of the top record 402.
The "Expand lists" check box 310 is selected if the value of the "Expand" field 405 of the top record 402 is found equal to TRUE.
The "Bcc:" check box 312 is selected if the value of the "Bcc" field 408 of the top record 402 is found equal to TRUE.
The "Cc:" check box 313 is selected if the value of the "Cc" field 409 of the top record 402 is found equal to TRUE.
The "To:" check box 314 is selected if the value of the "To" field 410 of the top record 402 is found equal to TRUE.
The list of recipients resulting from the values found in the fields 405, 406, 407, 408, 409, 410 is then evaluated and shown on the recipient list box 311 by deselecting the names which are not present.
Finally each selected (respectively deselected) name in the recipient list box 311 is deselected (respectively selected) if found present in the "List Exceptions" field 404 of the top record 402.

At step 514, the current text selection receives a flashing background color corresponding to the color pad 304 above the selected radio button 305.

At step 515, the method waits for a user action on the Selective Mail Manager dialog box 301.

At step 516, a user event has been detected on the Selective Mail Manager dialog box 301:
If it is a click on the up-down scrolling bar 309, then control is given to step 517.
If it is a click on the push-button 306 "Close" or on the closing-window icon 315, then control is given to step 518.
If it is a click on the push-button 316 "Delete Section", then control is given to step 520.
If it is an update of the text entry fields 302 "Filter IN" or 303 "Filter OUT", then control is given to step 521.
If it is a click on one of the radio buttons 305, then control is given to step 522.
If it is a click on the check box 310 "Expand lists", then control is given to step 523.

If it is a click on the push-button 308 "Reset list", then control is given to step 524.

If it is a click on one of the check boxes 312 "Bcc:", or 313 "Cc:", or 314 "To:", then control is given to step 525.

If it is a click on the push-button 307 "Save", then control is given to step 526.

At step 517, the recipient list box 311 is scrolled up or down according to the selected scrolling direction. Then control is given back to step 515.

At step 518, the Selective Mail Manager dialog box 301 is closed.

At step 519, the recipient list is computed for each record of the MAMT 401 table, according to the values found in the fields 404 to 410. Then for each defined section within the mail text body, the opening tag attributes are updated to reflect the values found in the fields of the MAMT record with a "List ID" field 412 matching the tag Id attribute. Finally the flashing of the text (as initialized at step 514) is stopped. Then control is given back to step 501 for handling a future Mail Address Manager command.

At step 520, the opening and closing tags around the current selected section are removed, and control is given to step 518.

At step 521, the fields "Filter IN" 407 and/or "Filter OUT" 406 of the top record 402 of the MAMT 401 table are updated according to the respective values of the text entry fields "Filter IN" 302 and/or "Filter OUT" 303. Then control is given to step 513.

At step 522, the body record 403 whose "List Color" field 411 corresponds to the color pad 304 above the selected radio button 305, is copied onto the top record 402 of the MAMT 401 table. Then control is given to step 527.

At step 523, the "Expand" field 405 of the top record 402 of the MAMT 401 table is set equal to TRUE (respectively FALSE) if the check box "Expand list" 310 is selected (respectively deselected). Then control is given to step 513.

At step 524, the field "List Exceptions" 404 of the top record 402 of the MAMT 401 table is cleared. Then control is given to step 513.

At step 525, the "Bcc" field 408 of the top record 402 of the MAMT 401 table is set equal to TRUE (respectively FALSE) if the check box "Bcc:" 312 is selected (respectively deselected). The "Cc" field 409 of the top record 402 of the MAMT 401 table is set equal to TRUE (respectively FALSE) if the check box "Cc:" 313 is selected (respectively deselected). The "To" field 410 of the top record 402 of the MAMT 401 table is set equal to TRUE (respectively FALSE) if the check box "To:" 314 is selected (respectively deselected). Then control is given to step 513.

At step 526, the top record 402 of the MAMT 401 table is copied onto the body record 403 with the same "List ID" field 412. Then control is given to step 513.

At step 527, the Id attribute of the opening tag of the selected section is updated with the value of the "List ID" field 412 of the top record 402 of the MAMT 401 table. Then control is given to step 513.

When the e-mails are prepared to be given to the SMTP stack according to the input obtained through the graphical interface, they are built up to be sent by the SMTP stack. The build up of the e-mails may be done in three different ways. One way is when the mail author has only entered a recipient list and has not colored sections of the mails. This means that only one mail will be prepared with the entire initial message text and the recipient list is computed according to the mail author inputs. In the MAMT table will be stored only one line with the inputs from the mail author for the recipient list rule and without any color for the text, meaning that the entire text is concerned by the line. The text will be tagged from beginning to the end with tags containing the LIST id of the MAMT table line.

In the case where some sections are colored, and a recipient list is computed for each section, the messages will be built by associating each colored section with the corresponding recipient list computed from the inputs provided by the mail author. One line is created in the MAMT table for each section associated with a recipient list rule. The tags encompassing in the message text each section will point with the LIST id to the corresponding record in the MAMT table.

In another embodiment, the section tags of the colored sections are compatible with the tag defined in the European application entitled "A SYSTEM AND METHOD FOR PREPARING E-MAILS" serial number 04291949.8 filed Jul. 29, 2004 by F. Bauchot, F-X Drouet and G. Marmigere referenced in the Background section of this patent application. In this case, the SMP (Selective Mail Parser) can be used for preparing the mails to be given to the SMTP stack of the user to be sent to the local mail management server. In this case also, an additional programming block can modify the recipient lists of the mails prepared by the SMP. Also, the SMTP stack sends the modified mails to the recipient list prepared by the SPM instead of the recipient list read inside the modified mails.

The programming within workstation 200 can be loaded from a computer storage medium such as a magnetic disk, optical disk, DVD, etc. or downloaded from network media via the Internet. The computer storage media, network media and semiconductor memory are collectively called "computer readable media".

The invention claimed is:

1. A method executed at a workstation for selecting recipients of an e-mail, said method comprising the steps of:

said workstation displaying an initial list of potential recipients of said e-mail;

identifying to said workstation a first subset portion of text of said e-mail;

identifying to said workstation a first type of recipient to receive the first subset portion of said e-mail, said initial list including at least one recipient of said first type;

identifying to said workstation a second type of recipient not to receive the first subset portion of said e-mail;

said workstation determining if said initial list of recipients to receive said e-mail includes a recipient of said second type;

said workstation automatically determining a final list of recipients to receive the first subset portion of said e-mail, said final list being the potential recipients of said initial list which are said first type but not said second type;

identifying to said workstation a second subset portion of text of said e-mail;

identifying to said workstation a third type of recipient to receive the second subset portion of said e-mail, said initial list including at least one recipient of said third type;

identifying to said workstation a fourth type of recipient not to receive the second subset portion of said e-mail; and said workstation automatically determining another final list of recipients to receive the second subset portion of said e-mail, said another final list being the potential recipients of said initial list which are said third type but not said fourth type.

2. A method as set forth in claim 1 wherein said first type of recipients are identified in the initial list with a background color previously selected using a graphical user interface of the workstation, and the first subset portion of said email is identified by changing a first background color of the first subset portion of said email to the background color.

3. A method as set forth in claim 2, wherein the third type of recipients are identified in the initial list with another background color different from the background color, and the second subset portion of said email is identified by changing a second background color of the second subset portion of said email to the another background color.

4. A method as set forth in claim 3 wherein the first type of recipient, the second type of recipient, the third type of recipient, the fourth type of recipient, the background color and the another background color are saved in a table to form a manager table, and certain elements from the manager table are retrieved based upon which subset portion of the email is subsequently selected as being an active subset portion.

5. A method as set forth in claim 1 wherein said first type of recipients are recipients with an e-mail address at a specified company, and wherein said second type of recipients are recipients with an e-mail address at the specified company in a specified country.

6. A system for selecting recipients of an e-mail, said system comprising:
    means for displaying an initial list of potential recipients of said e-mail;
    means for identifying to said workstation a first subset portion of text of said e-mail;
    means for identifying a first type of recipient to receive the first subset portion of said e-mail, said initial list including at least one recipient of said first type;
    means for identifying a second type of recipient not to receive the first subset portion of said e-mail;
    means for determining a final list of recipients to receive the first subset portion of said e-mail, said final list being the potential recipients of said initial list which are said first type but not said second type;
    means for identifying to said workstation a second subset portion of text of said e-mail;
    means for identifying to said workstation a third type of recipient to receive the second subset portion of said e-mail, said initial list including at least one recipient of said third type;
    means for identifying to said workstation a fourth type of recipient not to receive the second subset portion of said e-mail; and
    means for determining another final list of recipients to receive the second subset portion of said e-mail, said another final list being the potential recipients of said initial list which are said third type but not said fourth type.

7. A system as set forth in claim 6 wherein said first type of recipients are identified in the initial list with a background color previously selected using a graphical user interface of the workstation, and the first subset portion of said email is identified by changing a first background color of the first subset portion of said email to the background color.

8. A system as set forth in claim 7, wherein the third type of recipients are identified in the initial list with another background color different from the background color, and the second subset portion of said email is identified by changing a second background color of the second subset portion of said email to the another background.

9. A system as set forth in claim 8 wherein the first type of recipient, the second type of recipient, the third type of recipient, the fourth type of recipient, the background color and the another background color are saved in a table to form a manager table, and certain elements from the manager table are retrieved based upon which subset portion of the email is subsequently selected as being an active subset portion.

10. A system as set forth in claim 6 wherein said first type of recipients are recipients with an e-mail address at a specified company, and wherein said second type of recipients are recipients with an e-mail address at the specified company in a specified country.

11. A computer program product for execution at a workstation to assist a user in selecting recipients of an e-mail, said computer program product comprising:
    a computer readable storage medium;
    first program instructions to display an initial list of potential recipients of said e-mail;
    second program instructions for identifying to said workstation a first subset portion of text of said e-mail;
    third program instructions to allow the user to identify a first type of recipient to receive the first subset portion of said e-mail, said initial list including at least one recipient of said first type;
    fourth program instructions to allow a user to identify a second type of recipient not to receive the first subset portion of said e-mail;
    fifth program instructions to automatically determine a final list of recipients to receive the first subset portion of said e-mail, said final list being the potential recipients of said initial list which are said first type but not said second type;
    sixth program instructions for identifying to said workstation a second subset portion of text of said e-mail;
    seventh program instructions for identifying to said workstation a third type of recipient to receive the second subset portion of said e-mail, said initial list including at least one recipient of said third type;
    eighth program instructions for identifying to said workstation a fourth type of recipient not to receive the second subset portion of said e-mail; and
    ninth program instructions for determining another final list of recipients to receive the second subset portion of said e-mail, said another final list being the potential recipients of said initial list which are said third type but not said fourth type, and wherein said first, second, third, fourth, fifth, sixth, seventh, eighth and ninth program instructions are stored on said medium.

12. A computer program product as set forth in claim 11 wherein said first type of recipients are identified in the initial list with a background color previously selected using a graphical user interface of the workstation, and the first subset portion of said email is identified by changing a first background color of the first subset portion of said email to the background color.

13. A computer program product as set forth in claim 12, wherein the third type of recipients are identified in the initial list with another background color different from the background color, and the second subset portion of said email is identified by changing a second background color of the second subset portion of said email to the another background color.

14. A computer program product as set forth in claim 13 wherein the first type of recipient, the second type of recipient, the third type of recipient, the fourth type of recipient, the background color and the another background color are saved in a table to form a manager table, and certain elements from the manager table are retrieved based upon which subset portion of the email is subsequently selected as being an active subset portion.

15. A computer program product as set forth in claim 11 wherein said first type of recipients are recipients with an e-mail address at a specified company, and wherein said second type of recipients are recipients with an e-mail address at the specified company in a specified country.

16. A computer program product as set forth in claim 11 wherein the workstation comprises a graphical user interface having a dialog box, wherein the dialog box comprises a filter-in field for specifying the first type of recipient group to receive the selected portion of the email and a filter-out field for specifying the second type of recipient group not to receive the selected portion of the email.

17. A method executed at a workstation for selecting recipients of an e-mail, said method comprising the steps of:
   said workstation displaying an initial list of potential recipients of said e-mail;
   identifying to said workstation a plurality of different portions of text of said e-mail;
   identifying to said workstation a first type of recipient group to receive a selected portion of the plurality of different portions of said text of said e-mail, said initial list including at least one recipient of said first type, wherein the recipient group comprises a plurality of individual recipients;
   identifying to said workstation a second type of recipient not to receive said selected portion of said e-mail, said initial list including at least one recipient of said second type; and
   automatically determining a final list of recipients to receive said selected portion of said e-mail, said final list being the recipients of said initial list which are said first type but not said second type.

18. The method of claim 17, wherein the plurality of different portions of text comprises a main portion of text and another portion of text, and wherein the main portion of text is sent to each of the plurality of individual recipients in the first type of recipient group, and wherein the another portion of text is sent to the final list of recipients.

19. The method of claim 18, wherein a background color associated with the main portion of text is changed to match a selected color that is selectable using a graphical user interface of the workstation.

20. The method of claim 17, wherein the workstation comprises a graphical user interface having a dialog box, wherein the dialog box comprises a filter-in field for specifying the first type of recipient group to receive the selected portion of said email and a filter-out field for specifying the second type of recipient group not to receive the selected portion of said email.

* * * * *